United States Patent [19]

Sakamaki

[11] Patent Number: 5,540,453
[45] Date of Patent: Jul. 30, 1996

[54] CHUCKING APPARATUS

[75] Inventor: Akira Sakamaki, Ojiya, Japan

[73] Assignee: Yukiwa Seiko Kabushiki Kaisha, Niigata-ken, Japan

[21] Appl. No.: 366,102

[22] Filed: Dec. 29, 1994

[30] Foreign Application Priority Data

Dec. 29, 1993 [JP] Japan ................................. 5-354557

[51] Int. Cl.⁶ ........................................... B23B 31/12
[52] U.S. Cl. .......................... 279/60; 279/62; 279/156; 408/226
[58] Field of Search .......................... 279/60–65, 104, 279/93, 156; 408/226

[56] References Cited

U.S. PATENT DOCUMENTS

| | | | |
|---|---|---|---|
| 500,153 | 6/1893 | Parman | 279/93 |
| 768,396 | 8/1904 | North | 279/62 |
| 1,035,495 | 8/1912 | Szietl | 279/62 |
| 2,137,557 | 11/1938 | Ziganek | 279/93 |
| 2,315,524 | 4/1943 | Hubbell | 279/62 |
| 2,378,339 | 10/1945 | Meyer | 279/61 |
| 3,384,386 | 5/1968 | Ward et al. | 279/93 |

FOREIGN PATENT DOCUMENTS

| | | | |
|---|---|---|---|
| A10465409 | 1/1992 | European Pat. Off. . | |
| 832373 | 1/1952 | Germany . | |
| 15-13166 | 5/1940 | Japan . | |
| 48-3890 | 1/1973 | Japan . | |
| 50-99585 | 8/1975 | Japan . | |
| 0282805 | 12/1987 | Japan | 279/156 |
| 321852 | 5/1991 | Japan . | |
| 329056 | 6/1991 | Japan . | |

*Primary Examiner*—Steven C. Bishop
*Attorney, Agent, or Firm*—Sughrue, Mion, Zinn, Macpeak & Seas

[57] ABSTRACT

To provide a chucking apparatus which may impart a sufficient cutting force and an axial holding force to a tool, concave/convex portions which are engaged with each other are formed in a proximal end of the tool and a contact portion with which the proximal end of said tool is brought into contact when said tool is mounted on said chucking apparatus, and an angle defined by rising walls and end faces of the concave/convex portions which face each other is set at an acute angle.

12 Claims, 7 Drawing Sheets

FIG. 18

CHUCKING APPARATUS

BACKGROUND OF THE INVENTION

The present invention relates to a chucking apparatus for holding a tool.

A technique for exhibiting a strong cutting force to a tool has been proposed in Japanese Utility Model Examined Publication No. Hei 3-29056 (hereinafter referred to as the prior art).

In the prior art, semicylindrical concave and convex portions which are engaged with each other are formed in a proximal end face of a tool and a contact portion of a chucking apparatus body with which the proximal end face of the tool is brought into contact (in which upright surfaces of the semicylindrical concave and convex portions to face each other are perpendicular to the respective end faces). The concave and convex engagement of the concave and convex portions ensures a good transmission of a rotational torque to thereby exhibit a strong cutting force.

However, the prior art technique suffers from the following outstanding problems.

Namely, it is sure that the prior art may ensure the good transmission of the rotational torque to the tool and exhibits a strong cutting force but there is an outstanding problem relating to the enhancement of the holding force for the tool in the axial direction.

Figure 1:
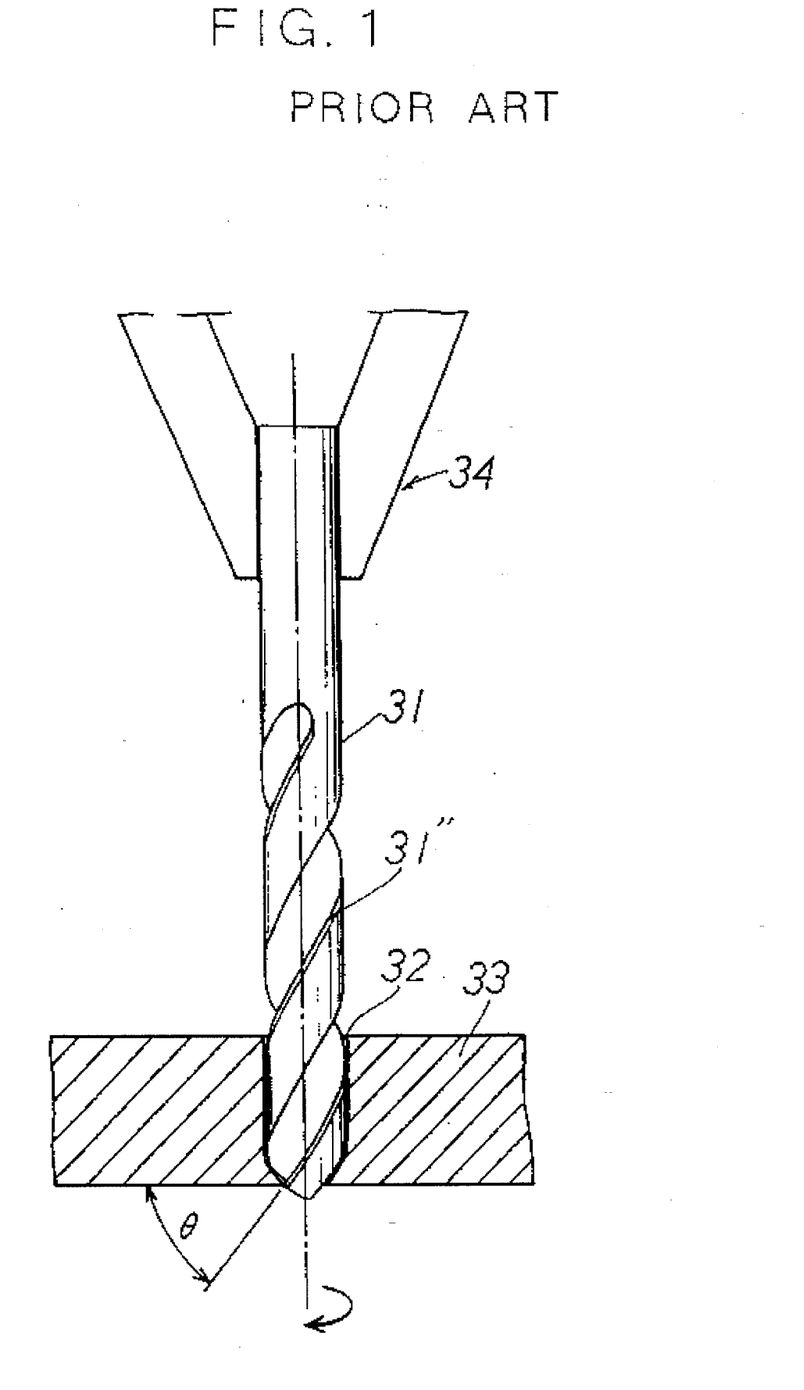
FIG. 1 is a partially cross-sectional view illustrating a conventional example.
Figure 2:
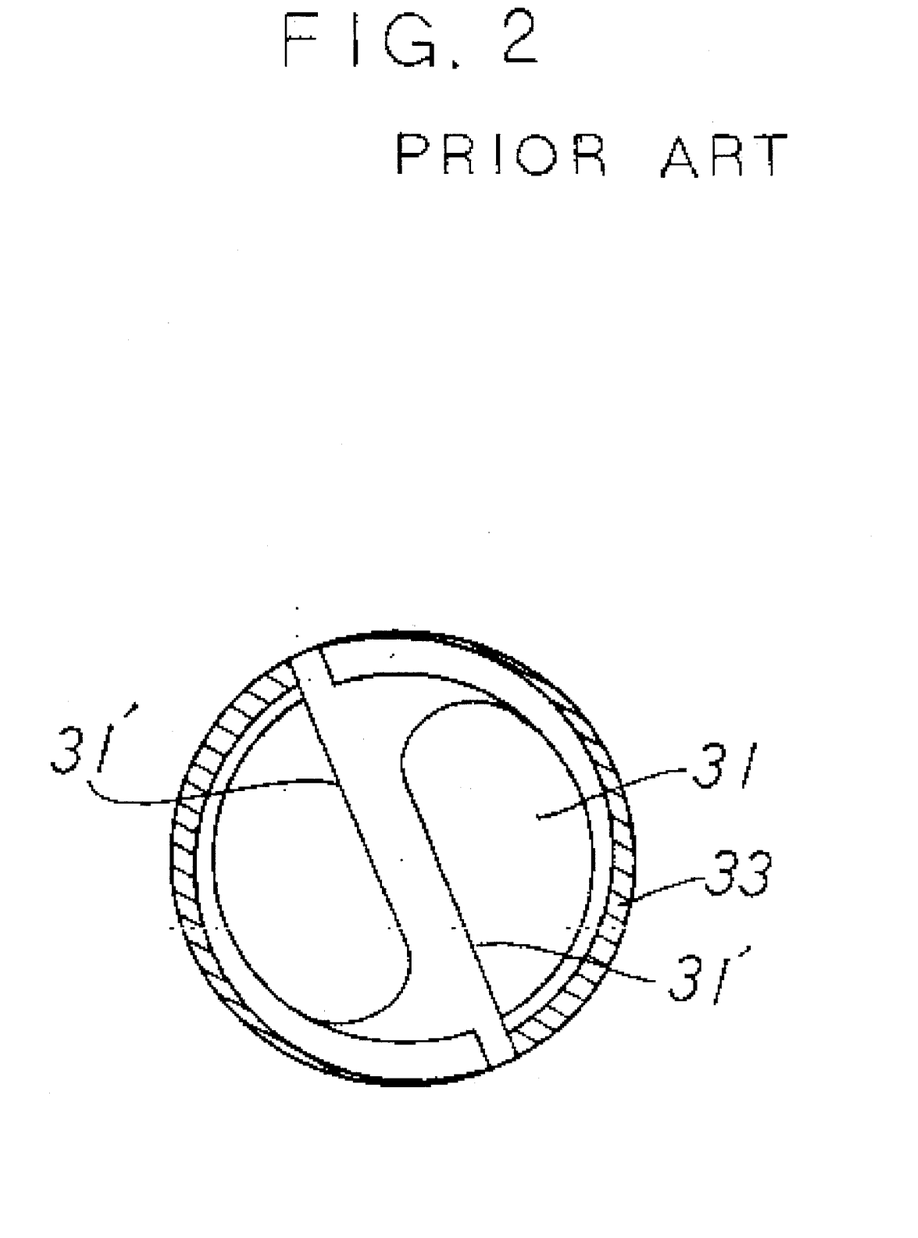
FIG. 2 is a bottom view illustrating the conventional example.

More specifically, i) in FIGS. 1 and 2, in case of boring a penetration hole 32 with a tool (drill 31), because a force for forcing the drill 31 apart from a chucking apparatus 34 is generated when the drill 31 has penetrated through a workpiece 33 to be worked, there is a fear that the drill 31 would be pulled away from the chucking apparatus 34.

This will be explained in detail with reference to FIGS. 1 and 2.

The drill 31 is composed of two teeth and loci of the teeth are spiral during the operation.

The moment at which the drill 31 has passed through the workpiece 32 is shown in FIG. 2 as viewed from the penetration side.

Since cutting tooth portions 31' of the drill 31 are rotationally moving in a spiral manner, the hatched portions in FIG. 2 have not yet been cut. However, since all the tip ends of the cutting tooth portions 31' of the drill 31 have passed through the workpiece, side wall portions 31" of the drill 31 are used to cut the hatched portions in FIG. 2.

Since the side wall portions 31" of the drill 31 have a twist angle, a tension force for drawing the drill per se is generated by the twist angle during the working operation of the hatched portions.

ii) There is a fear that the drill would be pulled apart from the chucking apparatus by the frictional force when the deep boring has been effected with the drill and the latter is pulled apart from the deep hole.

iii) In case of a drill apparatus in which the chuck apparatus is vibrated in the axial direction under the condition that the drill is held and a hole is formed while imparting a shock to the drill, or in case of another drill apparatus in which a hole is formed by striking a proximal end of a drill held by claw members with an air hammer (the two types of the drill apparatus will hereinafter be referred to as a striking drill apparatus), since a force is applied to the drill in the axial direction (toward the tip end of the drill), there is a fear that the drill would be pulled apart. In particular in the case where a friction is remarkable between the claw members for holding the drill and the tool, this phenomenon is remarkable.

SUMMARY OF THE INVENTION

In order to overcome the above-noted defects, an object of the present invention is to provide a chucking apparatus which of course exhibits a strong cutting force and also exhibits a good holding force in the axial direction relative to a tool.

According to a first aspect of the invention, there is provided a chucking apparatus for gripping a proximal portion of a tool with expandable/retractable claw members, characterized in that concave/convex portions which are engaged with each other are formed in a proximal end of the tool and a contact portion with which the proximal end of the tool is brought into contact when the tool is mounted on the chucking apparatus, and an angle defined by rising walls and end faces of the concave/convex portions which face each other is set at an acute angle.

According to the invention, a gap between the rising walls that face each other is set at a predetermined interval.

According to another aspect of the invention, there is provided a chucking apparatus for gripping a proximal portion of a tool with expandable/retractable claw members, characterized in that concave/convex portions which are engaged with each other are formed in a proximal end of the tool and a contact portion with which the proximal end of the tool is brought into contact when the tool is mounted on the chucking apparatus, an angle defined by rising walls and end faces of the concave/convex portions which face each other is set substantially at a right angle, and a convex portion is formed on the rising wall.

According to still another aspect of the invention, there is provided a chucking apparatus for gripping a proximal portion of a tool with expandable/retractable claw members, characterized in that concave/convex portions which are engaged with each other are formed in a proximal end of the tool and a contact portion with which the proximal end of the tool is brought into contact when the tool is mounted on the chucking apparatus, and rising walls of the concave/convex portions which face each other is set at a predetermined interval.

According to the present invention, the concave/convex portions may be different in hardness.

As described above, according to the first aspect of the present invention, since the concave/convex portions of the tool and the contact portion with which the tool contacts are engaged with each other, the rotational torque of the chucking apparatus body is well transmitted to the tool. Also, since the angle defined by the rising walls and the end faces of the concave/convex portions which face each other is set at an acute angle, when the chucking apparatus is rotated, the plastic and elastic deformation is generated by the contact area pressure between the tool and the contact portion, and the tool and the contact portion are held in a retained state to provide a good axially holding force to the tool. Incidentally, in the case where the two angles defined by the tool and the contact portion are both set at an acute angle (see FIG. 6), the above-described deformation is reduced. However, in comparison with the case where the angle is a right angle, the retaining effect may be exhibited.

According to the other aspect of the invention, since the concave/convex portions of the tool and the contact portion with which the tool contacts are engaged with each other, the rotational torque of the chucking apparatus body is well transmitted to the tool. Also, the convex portion is formed on the rising wall, when the chucking apparatus is rotated, the plastic and elastic deformation is generated by the contact area pressure between the convex portion and the rising wall with which faces the convex portion, and the tool and the contact portion are held in a retained state to provide a good axially holding force to the tool.

According to the other aspect of the invention, since the concave/convex portions of the tool and the contact portion with which the tool contacts are engaged with each other, the rotational torque of the chucking apparatus body is well transmitted to the tool. Also, since a distance between the rising walls of the concave/convex portions is set at a predetermined interval L, for instance, when the chucking apparatus body is rotated and the contact portion with the tool is rotated, the contact portion (indicated as "Y" in FIG. 6) is brought into contact with the proximal end portion of the tool, the plastic and elastic deformation (bite) is generated by the contact area pressure between the tool and the contact portion, and the tool and the contact portion are held in a retained state to provide a good axially holding force to the tool. In this case, if the concave/convex portions are different in hardness, i.e., remarkable in difference in yield point or tensile strength, the above-described deformation is remarkable, and the retained state is kept better.

DESCRIPTION OF THE PREFERRED EMBODIMENTS

The present invention will now be described by way of example with reference to the accompanying drawings.

Figure 3:
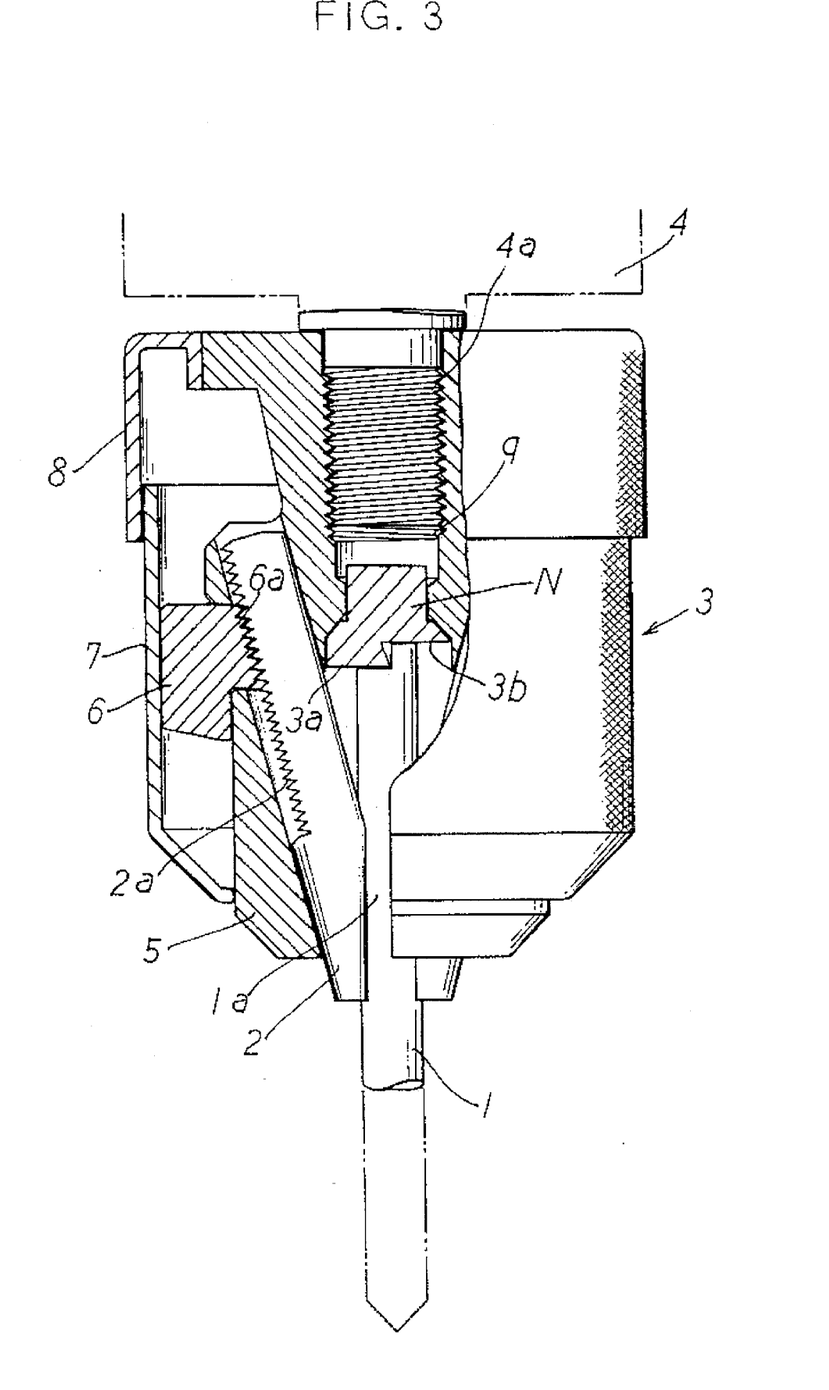
FIG. 3 is a partially cross-sectional view showing a used state of the apparatus according to an embodiment of the invention.

FIG. 3 shows a chucking apparatus 3 mounted on a tip end rotary shaft 4a of a handy type electric powered drill apparatus 4 in which three claw members 2 are radially provided to a body 5, a nut sleeve 6 is rotatably provided on the body 5, and a female screw portion 6a of the nut sleeve 6 is threadedly engaged with a male screw portion 2a of each claw member 2.

A rotational sleeve 7 is fixed to the nut sleeve 6, and also, a grip sleeve 8 fixed to a proximal end of the body 5 is provided at a base portion of the body 5.

A mount female screw hole 9 is formed in the base portion of the body 5. A coupling member (screw) N in which a semicylindrical convex potion 3a and a semicylindrical concave portion 3b are formed as viewed from below in FIG. 3 is fixed to the mount female screw hole 9. In the case shown in FIG. 3, the coupling member (screw) N is pressingly fitted to the mount female screw hole 9. However, the fastening means of the coupling member (screw) N for the mount female screw hole 9 may of course be of any other type. For instance, it is not always necessary to use a discrete member as the coupling member (screw) N separated from the chuck body 3 but it is possible to form a coupling portion, having the same shape as the coupling member (screw) N, integrally with the chuck body 3 per se or to form a suitable concave and convex portion at a tip end of the main shaft of the electric drill.

Incidentally, in consideration of the case of the striking type drill apparatus as mentioned in conjunction with the item iii) to be solved by the present invention, it is possible to provide the coupling member (screw) N which is slidable in the axial direction but not rotatable.

In the embodiment shown, the tool 1 in FIG. 3 is a drill.

There are many combinations between the tool 1 and the coupling member (screw) N. Certain combinations thereof will be explained as follows.

Figure 4:
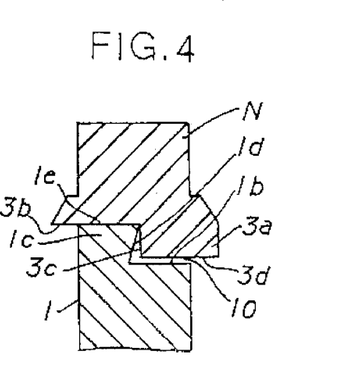
FIG. 4 is an enlarged, partially cross-sectional view showing another embodiment of the invention.

In FIG. 4, a substantially semicylindrical concave portion 1b and a substantially semicylindrical convex portion 1c are formed at the proximal end of the tool 1, whereas a substantially semicylindrical convex portion 3a and a substantially semicylindrical concave portion 3b which are engaged with the semicylindrical concave and convex portions 1b and 1c, respectively, are formed in the coupling member (screw) N with an angle defined between a rising wall 1d of the semicylindrical convex portion 1c of the tool 1 and the end face 1e thereof being set at an acute angle.

Figure 5:
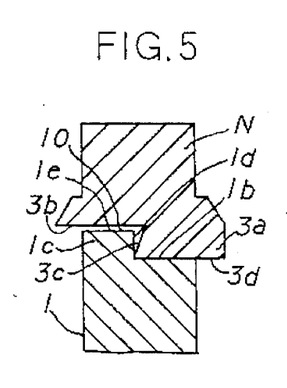
FIG. 5 is an enlarged, partially cross-sectional view showing another embodiment of the invention.

In FIG. 5, a substantially semicylindrical concave portion 1b and a substantially semicylindrical convex portion 1c are formed at the proximal end of the tool 1, whereas a substantially semicylindrical convex portion 3a and a substantially semicylindrical concave portion 3b which are engaged with the semicylindrical concave and convex portions 1b and 1c, respectively, are formed in the coupling member (screw) N with an angle defined between a rising wall 3c of the semicylindrical convex portion 3a of the coupling member (screw) N and the end face 3d thereof being set at an acute angle.

Figure 6:
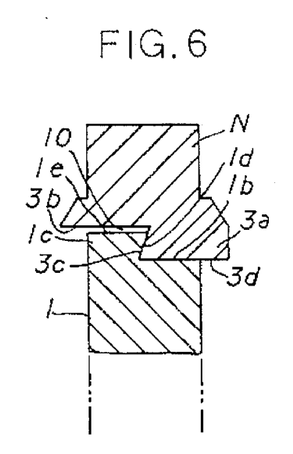
FIG. 6 is an enlarged, partially cross-sectional view showing another embodiment of the invention.
Figure 7:
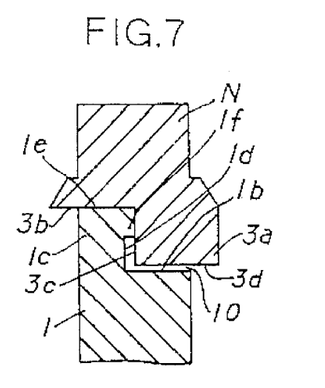
FIG. 7 is an enlarged, partially cross-sectional view showing another embodiment of the invention.
Figure 8:
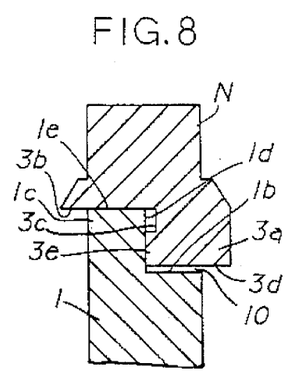
FIG. 8 is an enlarged, partially cross-sectional view showing another embodiment of the invention.

In FIG. 6, a substantially semicylindrical concave portion 1b and a substantially semicylindrical convex portion 1c are formed at the proximal end of the tool 1, whereas a substantially semicylindrical convex portion 3a and a substantially semicylindrical concave portion 3b which are engaged with the semicylindrical concave and convex portions 1b and 1c, respectively, are formed in the coupling member (screw) N with an angle defined between a rising wall 1d of the semicylindrical convex portion 1c of the tool 1 and the end face 1e thereof being set at an acute angle and also with an angle defined between a rising wall 3c of the semicylindrical convex portion 3a of the coupling member (screw) N and the end face 3d thereof being set at an acute angle.

The foregoing three types of the arrangement are included in a first aspect of the invention. Incidentally, in the arrangement shown in FIGS. 4 through 6, if a predetermined distance L is set between the rising walls 1d and 3c which face the acute angle portion, this arrangement is included in a second aspect of the invention. This type is the same as that of the type shown in FIG. 14 and the detailed explanation therefor will be omitted.

Figure 9:
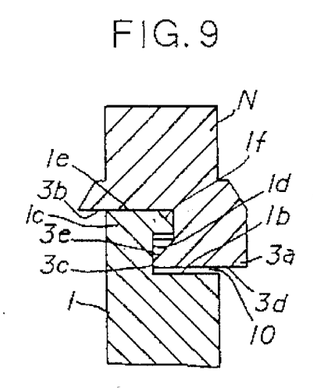
FIG. 9 is an enlarged, partially cross-sectional view showing another embodiment of the invention.
Figure 10:
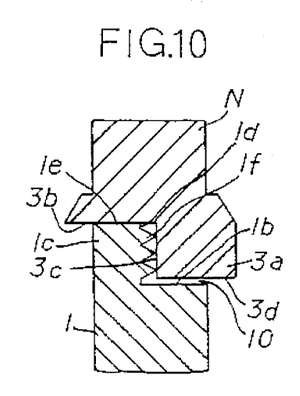
FIG. 10 is an enlarged, partially cross-sectional view showing another embodiment of the invention.
Figure 11:
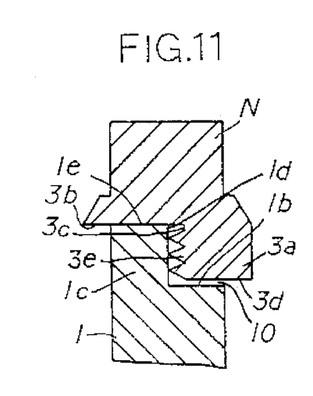
FIG. 11 is an enlarged, partially cross-sectional view showing another embodiment of the invention.
Figure 12:
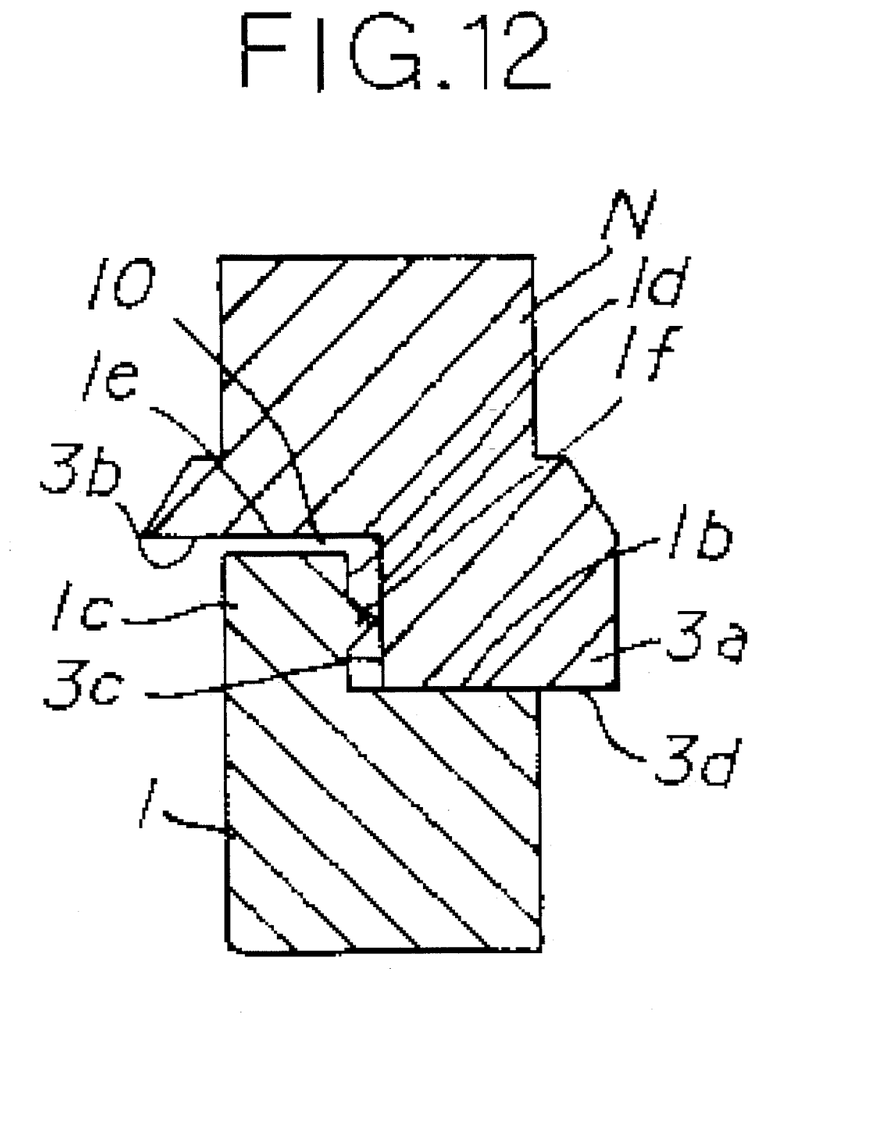
FIG. 12 is an enlarged, partially cross-sectional view showing another embodiment of the invention.
Figure 13:
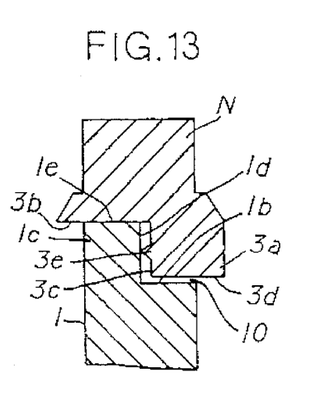
FIG. 13 is an enlarged, partially cross-sectional view showing another embodiment of the invention.

In FIGS. 7 through 13, a substantially semicylindrical concave portion 1b and a substantially semicylindrical convex portion 1c are formed at the proximal end of the tool 1, whereas a substantially semicylindrical convex portion 3a and a substantially semicylindrical concave portion 3b which are engaged with the semicylindrical concave and convex portions 1b and 1c, respectively, are formed in the coupling member (screw) N with an angle defined between a rising wall 1d of the semicylindrical convex portion 1c of the tool 1 and the end face 1e thereof being set substantially at a right angle and also with an angle defined between a rising wall 3c of the semicylindrical convex portion 3a of the coupling member (screw) N and the end face 3d thereof being set substantially at a right angle. Furthermore, a convex portion 1f, 3e is formed in either one or both of the rising wall 1d of the semicylindrical convex portion 1c of the tool 1 and the rising wall 3c of the semicylindrical convex portion 3a of the coupling member (screw) N. It is preferable that the convex portion 1f, 3e be formed over a full radial length of the tool 1 and the coupling member (screw) N but it is of course sufficient that the portion is formed in a part of the full radial length of the tool 1 and the coupling member (screw) N. Incidentally, FIG. 9 shows a state where the convex portions 1f, 3e are engaged with each other.

These seven types are included in a third aspect of the invention. Incidentally, in the arrangement shown in FIGS. 7 through 13, it is possible to set a predetermined distance L between the rising walls 1d and 3c which face the convex portion 3e, 1f. This type is the same as that of the type shown in FIG. 14 and the detailed explanation therefor will be omitted.

Figure 14:
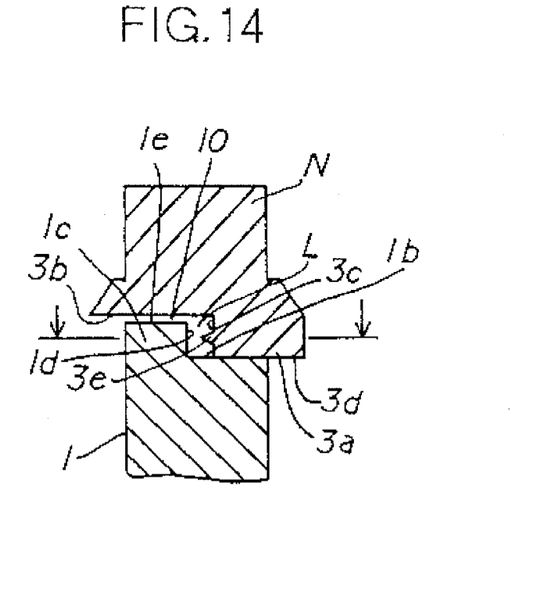
FIG. 14 is an enlarged, partially cross-sectional view showing another embodiment of the invention.
Figure 15:
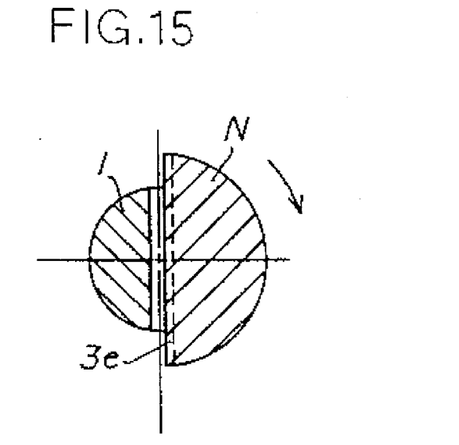
FIG. 15 is an enlarged, cross-sectional view taken along the line indicated by the arrows in FIG. 14.
Figure 16:
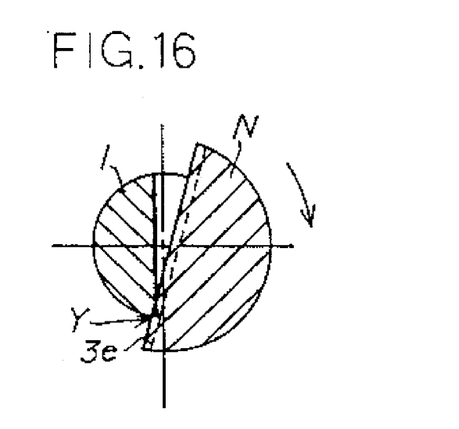
FIG. 16 is another enlarged, cross-sectional view taken along the line indicated by the arrows in FIG. 14.
Figure 17:
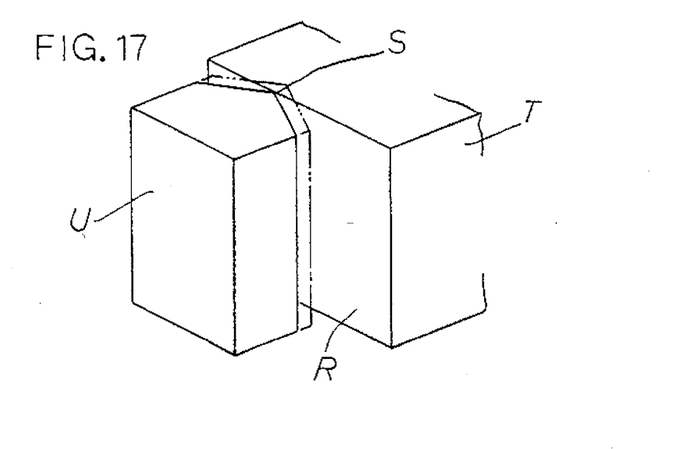
FIG. 17 is an illustration of the embodiments of the invention.
Figure 18:
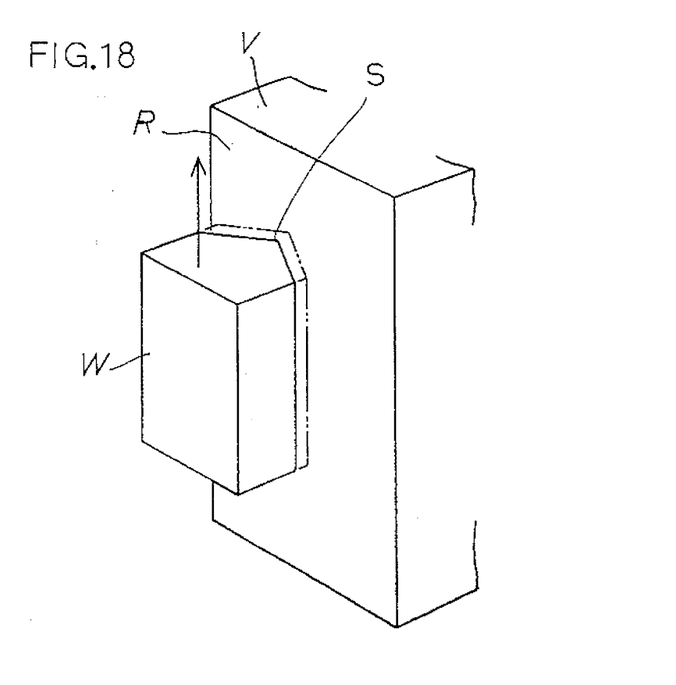
FIG. 18 is another illustration of the embodiments of the invention.

In FIG. 14, a substantially semicylindrical concave portion 1b and a substantially semicylindrical convex portion 1c are formed at the proximal end of the tool 1, whereas a substantially semicylindrical convex portion 3a and a substantially semicylindrical concave portion 3b which are engaged with the semicylindrical concave and convex portions 1b and 1c, respectively, are formed in the coupling member (screw) N with an angle defined between a rising wall 1d of the semicylindrical convex portion 1c of the tool 1 and the end face 1e thereof being set substantially at a right angle and also with an angle defined between a rising wall 3c of the semicylindrical convex portion 3a of the coupling member (screw) N and the end face 3d thereof being set substantially at a right angle. Furthermore, a convex portion 3e is formed in the rising wall 3c of the semicylindrical convex portion 3a of the coupling member (screw) N and a distance L is set between the rising wall 1d of the semicylindrical convex portion 1c of the tool 1 and the rising wall 3c of the semicylindrical convex portion 3a of the coupling member (screw) N. Incidentally, it is preferable that the convex portion 3e formed in the rising wall 3c of one semicylindrical convex portion 3a should not be equal in height with the rising wall 1d of the other semicylindrical convex portion 1c. (Of course the convex portion 3e shown in FIG. 14 is different in height with the rising wall 1d since the convex portin 3e being formed in the lateral direction. However, for instance, when the convex portion 3e is formed in the vertical direction, the difference in height between the rising wall 1d and the convex portion 3e works effectively.) This is why a good retained condition when a plastic deformation or an elastic deformation is generated by the contact between both. The retained condition is better by the deformation of both in the case where a projection S of a member W having a different height as that of the wall R of the member V is contacted against and deformed by the wall R (FIG. 18), than that in the case where a projection S of a member U having the same height as that of the wall R of the member T (FIG. 17). As a result, the member W is more hardly moved in the direction indicated by the arrow. The two-dotted and dash lines in FIGS. 17 and 18 indicate the condition where the projection S is bit the wall R.

In the type shown in FIG. 14, since the distance L is provided between the rising walls 1d and 3c as described above, upon the cutting formation of the semicylindrical convex portions 1c and 3a, it is unnecessary to perform the cutting information of the semicylindrical convex portions 1c and 3a in order to exactly engage the concave/convex portions of the two components. For instance, it is unnecessary to provide the rising walls 1d and 3c so as to pass an axial center. This means that in the working site, it is possible to easily form the concave/convex portions. Thus, the type shown in FIG. 14 is practical. At the same time, it is possible to form the concave/convex portions without eliminating a center hole even in a tool which needs the center hole, such as an end mill, a tap or the like.

Incidentally, the gap 10 between the coupling member (screw) N and the tool 1 is set as desired.

As described above, it is preferable to provide a difference in hardness between the rising wall 1d of the semicylindrical convex portion 1c and the rising wall 3c of the semicylindrical convex portion 3a in the types shown in FIGS. 4 through 14. This is why the plastic or elastic deformation may readily be generated.

Summarizing the above, in the types shown in FIGS. 4, 5 and 6, the acute portion causes the deformation to realize the retained state. In the case of FIG. 6, the retained state could hardly be obtained in comparison with the cases of FIGS. 4 and 5 but the retained state may be obtained to some extent due to its configuration. Also, in the type shown in FIGS. 7 through 13, the convex portion 1f, 3e causes the deformation to realize the retained state. In FIG. 9, it is possible to obtain the retained state to some extent by its configuration in the same manner as in FIG. 6. The type typically shown in FIG. 14 having the distance L (which type is the case where the distance L is kept in the type shown in FIG. 13) out of the types shown in FIGS. 4 through 13 does not cause the contact until the rotation of the chucking apparatus 3 and, only after the contact, causes the deformation to realize the retained state.

For example, in the type shown in FIG. 14, the coupling member (screw) N and the tool 1 are brought into point contact with each other by the rotation of the chucking body 3. In the type shown in FIGS. 7 and 8 (in which the convex portion 1f, 3e is provided and the distance L is kept according to a fourth aspect of the invention from a different point of view), the coupling member (screw) N and the tool 1 are brought into linear contact with each other by the rotation of the chucking body 3. In the case where the convex portion 3e is not provided in the type shown in FIG. 14 (i.e., in the case where the distance L is simply, which is not shown in the drawings), the coupling member (screw) N and the tool 1 are brought into linear contact with each other by the rotation of the chucking body 3. In this sense, this type is the same as that shown in FIGS. 7 and 8 and is not preferable in view of the explanation in conjunction with FIGS. 17 and 18. However, it is possible to obtain a retained state to some extent due to the deformation.

Namely, in the types having the distance L, it is most preferable that both components are brought into point contact with each other because the contact area pressure is kept at a maximum, and in the case where both components are brought into linear contact with each other, it is preferable that the length for the linear contact is short in order to increase the contact area pressure as much as possible.

Incidentally, in the case where the present invention is applied to a tool 1 (drill) which is available on the market without any concave port, ion in the proximal end face, the drill may readily be cut by a grinder or the like in the working site. In this meaning, the types shown in FIGS. 5, 8, 11 and 13 is more practical. In the working site, the invention may readily be applied best to the drill in the case where the distance L is kept in the types shown in FIGS. 5, 8, 11 and 13.

In view of the foregoing features, in the type shown in, for example, FIG. 5, the mount female screw hole 9 is threadedly engaged with the tip end rotary shaft 4a of the electric powered drill apparatus 4 by manually gripping the grip sleeve 8 and the rotational sleeve 7 is rotated so that the claw members 2 are slidingly obliquely retracted and then expanded. The tool 1 is inserted into the space between the claw members 2 so that the semicylindrical concave portion 1b and the semicylindrical convex portion 1c of the proximal end of the tool 1 are engaged with the semicylindrical convex portion 3a and the semicylindrical concave portion 3b provided in the coupling member (screw) N provided in the mount female screw hole 9 in a concave/convex manner. Subsequently, the rotational sleeve 7 is rotated in the opposite direction to thereby slidingly obliquely advance the claw members 2 and to reduce the space of the claw members 2. As a result, the tool 1 is pressingly fastened by the claw members 2. Under this condition, when the electric powered drill apparatus 4 is operated, since the semicylindrical concave portion 1b and the semicylindrical convex portion 1c of the proximal end of the tool 1 are engaged with the semicylindrical convex portion 3a and the semicylindrical concave portion 3b provided in the coupling member (screw) N provided in the mount female screw hole 9 in a concave/convex manner, the rotational torque of the tip end rotary shaft 4a caused by the operation of the electric powered drill apparatus 4 is of course well transmitted to the tool 1, and further since the angle defined between the rising wall 3c and the end face 3d is acute, the plastic and elastic deformation is generated in the rising wall 1d by the rotation of the coupling member (screw) N. As a result, the holding force for the tool 1 in the axial direction may be well exhibited because of the engaged condition of the two components.

More specifically, when the penetration hole is formed in the workpiece, even if a force for forcing the drill apart from the chucking apparatus body 3 is applied when the drill penetrates the workpiece, the drill is positively prevented from being pulled apart from the chucking apparatus body 3. Also, the drill is positively prevented from being separated away from the chucking apparatus body 3 when the drill is to be drawn upon formation of a deep hole. Furthermore, even if the striking drill apparatus is used, the drill is positively prevented from being pulled apart from the chucking apparatus body 3.

Incidentally, for the structure of the tool 1 and the coupling member (screw) N, for example, the semicylindrical concave portion 1b and the semicylindrical convex portion 1c are formed at the proximal end of the tool 1 in the same manner. However, in the coupling member (screw) N, a recess into which the semicylindrical convex portion 1c of the tool 1 is inserted may be formed in a non-worked member. Of course, inversely, it is possible to form such a recess in the tool member 1.

With such arrangement according to the present invention, it is possible to impart a good cutting force and a good axial holding force to the tool.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A chucking apparatus for gripping a tool comprising:
  a body portion;
  a plurality of claw members, provided within the body portion, which are expandable and retractable, and capable of gripping a tool having concave and convex portions on a proximal end of the tool; and
  a coupling member disposed on the body having concave and convex portions which are capable of respectively engaging the convex and concave portions of the proximal end of the tool;
  wherein the concave and convex portions of the coupling member each have a separate end face and share a first common wall, the concave and convex portions of the proximal end of the tool each have a separate end face and share a second common wall, and an angle defined by one of the first and second common walls and an end face of one of the respective convex portions of the coupling member and the proximal end of the tool is an acute angle.

2. The chucking apparatus according to claim 1, wherein a gap between the common walls that face each other is set at a predetermined interval.

3. The chucking apparatus defined in claim 1, wherein the angle defined by the first common wall and the end face of the convex portion of the coupling member is an acute angle.

4. The chucking apparatus defined in claim 1, wherein the angle defined by the second common wall and the end face of the convex portion of the proximal end of the tool is an acute angle.

5. A chucking apparatus for gripping a tool comprising: a body portion; a plurality of claw members, provided within the body portion, which are expandable and retractable and capable of gripping a tool having concave and convex portions on a proximal end of the tool; and a coupling member disposed on the body having concave and convex portions which are capable of respectively engaging the convex and concave portions of the proximal end of the tool; wherein the concave and convex portions of the coupling member each have a separate end face and share a first common wall and the concave and convex portions of the proximal end of the tool each have a separate end face and share a second common wall, the first and the second common wall which face each other being set at a predetermined interval with respect to each other.

6. A chucking apparatus for gripping a proximal portion of a tool with expandable/retractable claw members, characterized in that concave/convex portions which are engaged with each other are formed in a proximal end of the tool and a contact portion with which the proximal end of said tool is brought into contact when said tool is mounted on said chucking apparatus, and an angle defined by rising walls and end faces of said concave/convex portions which face each other is set at an acute angle, wherein said concave/convex portions are of different hardness.

7. A chucking apparatus for gripping a proximal portion of a tool with expandable/retractable claw members, characterized in that concave/convex portions which are engaged with each other are formed in a proximal end of the tool and a contact portion with which the proximal end of said tool is brought into contact when said tool is mounted on said chucking apparatus, and an angle defined by rising walls and end faces of said concave/convex portions which face each other is set at an acute angle, wherein a gap between the rising walls that face each other is set at a predetermined interval and said concave/convex portions are different in hardness.

8. A chucking apparatus for gripping a proximal portion of a tool with expandable/retractable claw members, characterized in that concave/convex portions which are engaged with each other are formed in a proximal end of the tool and a contact portion with which the proximal end of said tool is brought into contact when said tool is mounted on said chucking apparatus, an angle defined by rising walls and end faces of said concave/convex portions which face each other is set substantially at a right angle, and a convex portion is formed on said rising wall, wherein said convex portion on said rising wall and said concave/convex portions are different in hardness.

9. A chucking apparatus for gripping a proximal portion of a tool with expandable/retractable claw members, characterized in that concave/convex portions which are engaged with each other are formed in a proximal end of the tool and a contact portion with which the proximal end of said tool is brought into contact when said tool is mounted on said chucking apparatus, and rising walls of said concave/convex portions which face each other is set at a predetermined interval, wherein said concave/convex portions are different in hardness.

10. A chucking apparatus for gripping a tool, comprising:

a body portion;

a plurality of claw members, provided within the body portion, which are expandable and retractable, and capable of gripping a tool having concave and convex portions on a proximal end of the tool; and a coupling member disposed on the body having concave and convex portions which are capable of respectively engaging the convex and concave portions of the proximal end of the tool;

wherein the concave and convex portions of the coupling member each have a separate end face and share a first common wall, the concave and convex portions of the proximal end of the tool each have a separate end face and share a second common wall, and an angle defined by one of the first and second common walls and an end face of one of the respective convex portions of the coupling member and the proximal end of the tool is substantially a right angle, and wherein a convex portion is formed on one of the first and second common walls.

11. The chucking apparatus according to claim 10, wherein the convex portion is formed on the second common wall.

12. The chucking apparatus according to claim 10, wherein the convex portion is formed on the first common wall.

\* \* \* \* \*